Sept. 10, 1929.   T. A. P. BAUM   1,727,691
SEAT
Filed Oct. 12, 1928   2 Sheets-Sheet 1
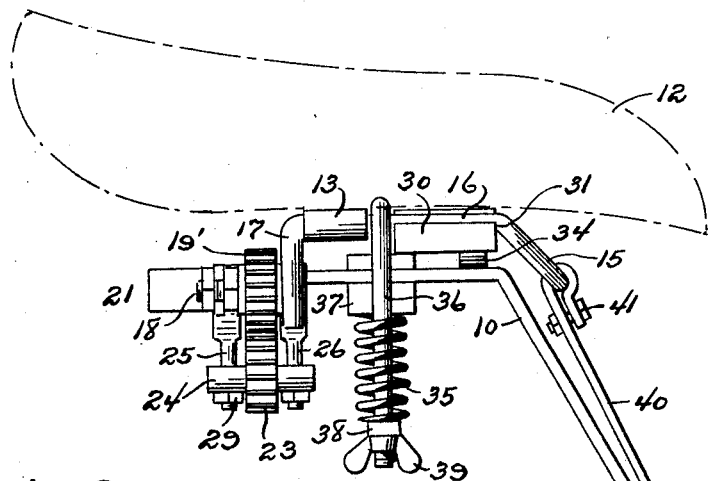
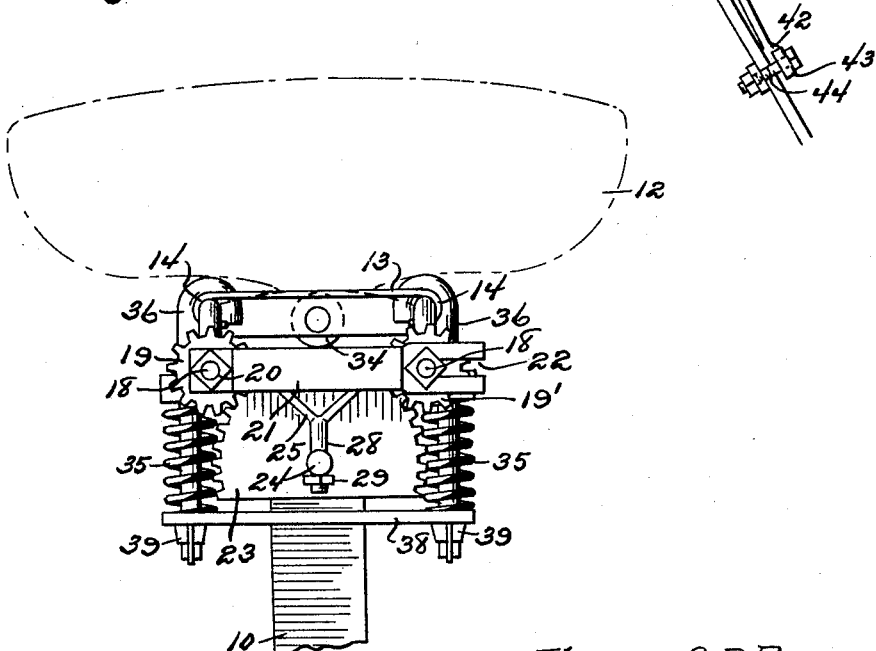
Thomas A. P. Baum
INVENTOR
BY Victor J. Evans
ATTORNEY Sept. 10, 1929.    T. A. P. BAUM    1,727,691
SEAT
Filed Oct. 12, 1928    2 Sheets-Sheet 2
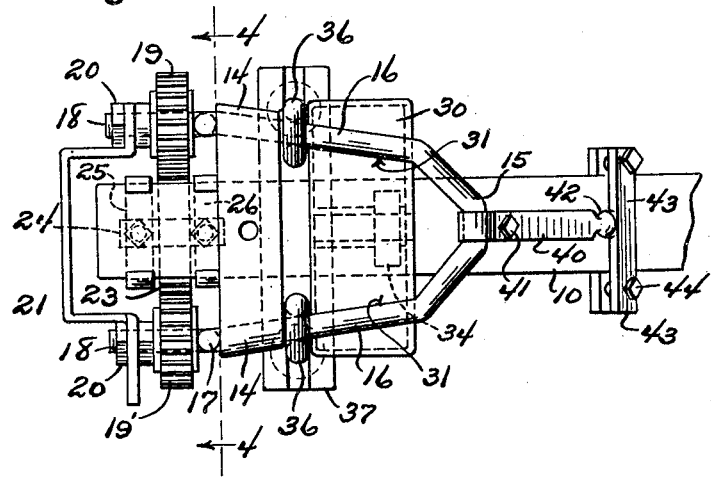
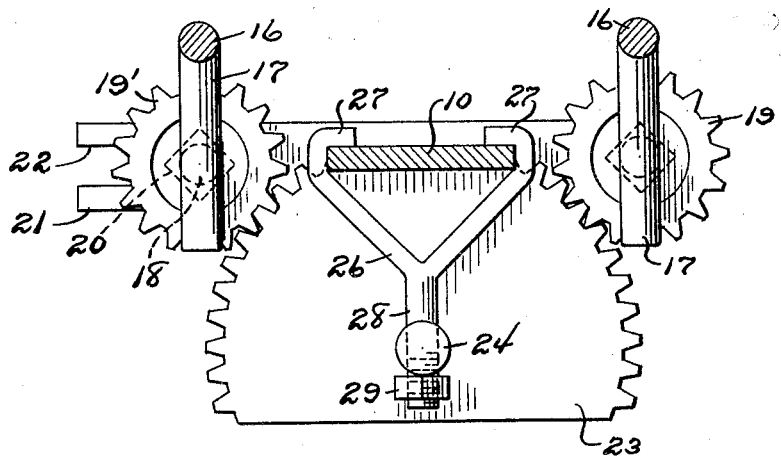
Thomas A. P. Baum
INVENTOR
BY Victor J. Evans
ATTORNEY Patented Sept. 10, 1929.

1,727,691

UNITED STATES PATENT OFFICE.

THOMAS A. P. BAUM, OF BOONVILLE, INDIANA.

SEAT.

Application filed October 12, 1928. Serial No. 312,137.

The object of this invention is to provide improved means for mounting a seat of the type employed for the use of the operator of a tractor, harrow, binder, or other agricultural machine, and for use under any similar circumstances.

A further object is to provide mounting means including adjustable resilient elements and a plurality of gear wheels or a gear wheel and a plurality of pinions, the pinions being mounted on the opposite arms of a frame forming a part of the seat supporting means, and the seat being retained in normal or approximately horizontal position when the machine is travelling over rough surfaces, thereby avoiding danger to the operator, and under slight degrees of movement avoiding the inconvenience and discomfort incident to rough travel.

In the drawings forming part of this application:

Figure 1 is a view of the device in side elevation.

Figure 2 is a view in rear elevation.

Figure 3 is a plan view.

Figure 4 is a section on line 4—4 of Figure 3.

A supporting element, seat post, or similar device is designated 10 and includes an upwardly extending portion and a rearwardly extending portion. The seat per se or saddle member is shown in dotted lines and is designated 12, and this element has secured thereto a transverse bar or strap 13, the latter having end portions such as 14 turned under and adapted to engage a U-shaped frame or the like, in the manner shown especially in Figures 1 and 2.

The U-shaped frame includes a forward portion 15, side portions 16, engaged by the elements 14 before referred to, and this U-shaped frame also includes downwardly extending portions 17 which are deflected rearwardly as shown at 18. Elements 18 constitute axles or mounting devices adapted to carry pinions such as 19 and 19' to be retained by nuts 20. The strap 21 extends across the end of deflected portions 18 and is retained between the nuts 20 and the pinions just referred to. This strap 21 is slotted at one end portion as shown at 22.

The pinions are adapted to engage centrally mounted gear wheel 23, and the latter is carried upon an axle element 24, the pinions being positioned on opposite sides of the gear wheel and axle and above the latter as the device appears in Figure 4.

The rearwardly extending portion of the element 10 is engaged by U-shaped brackets 25 and 26 having their spaced ends inwardly turned at 27 and projecting toward each other over the upper portion of seat post 10. The stems 28 of the Y members extend thru the axle member 24 and are engaged by nuts 29, the gear wheel being positioned between two Y brackets and supported in operative position with reference to the pinions. The axis of the large gear wheel 23 maintains a given position, but the axes of rotation of each of the pinions 19 and 19' varies with reference to the axis of the gear wheel, under rocking action of the U-shaped frame including the side elements 16.

The U-shaped bracket is mounted in a transverse block or the like designated 30, having grooves at 31 for the reception of the side members 16, and an upper plate 32 is positioned as shown in Figure 1 and also in Figure 3 and extends in the same direction as the block 30 but above the side elements 16.

Journaled in a recess within block 30 is a roller 34 adapted to bear on the horizontal portion of the seat post or supporting element 10, the roller moving over the surface of the horizontal portion, incident to relative movement between the machine and the seat or saddle 12.

The machine being subjected to use in such manner that excessive vibration is frequently experienced, the seat 12 is designed to remain in a substantially horizontal position, in view of the mounting which includes the members or elements thus far referred to and includes the resilient devices or coil springs 35 which surround the stems of hook members 36, the upwardly inwardly turned ends of which are carried along the side elements 16 of the U-shaped frame. The springs are mounted on said stems 36 between transverse bar 37 and a lower transverse bar 38 retained by nuts as shown at 39. The nuts or wing nuts, provide for adjustment of the springs, in an obvious manner.

The U-shaped bracket is connected at its forward end with a strap 40 having its upper end bent over and secured by a bolt 41 and the lower end of this element 40 carries a ball member 42 retained within a socket at 43, adjustment being secured by a bolt 44.

With the construction shown, movement in practically any direction is permitted, and the seat will tend to remain in normal position regardless of the surface over which the machine is travelling.

Having described the invention what is claimed is:—

1. In a device of the class described, a stationary supporting element, a seat, a movable frame for mounting the seat on the upper portion of the stationary element, the frame including side members with means connecting the forward portion of the frame with the stationary element, resiliently mounted means preventing excess of upward movement of the frame, these means including oppositely located springs and devices for rendering these springs effective on opposite sides of the movable frame, and means for mounting the frame adjacent to its forward portion and including a rotatable device the periphery of which has rolling surface contact with the stationary element and produces downward pressure thereon.

2. In a device of the class described, a stationary supporting element, a seat, a movable frame for mounting the seat on the upper portion of the stationary element, the frame including side members with deflected portions at the rear, means connecting the forward portion of the frame with the stationary element, resiliently mounted means preventing excess of upward movement of the frame, a gear wheel and means mounting this wheel on a fixed axis with reference to the stationary element, these means comprising a plurality of forked elements positioned on opposite sides of the gear wheel and connected with the means for mounting the latter, and pinions rotatably mounted on the movable frame and carried by the deflected portions stationary thereof, and meshing with the gear wheel.

In testimony whereof I affix my signature.

THOMAS A. P. BAUM.